Figure 3:
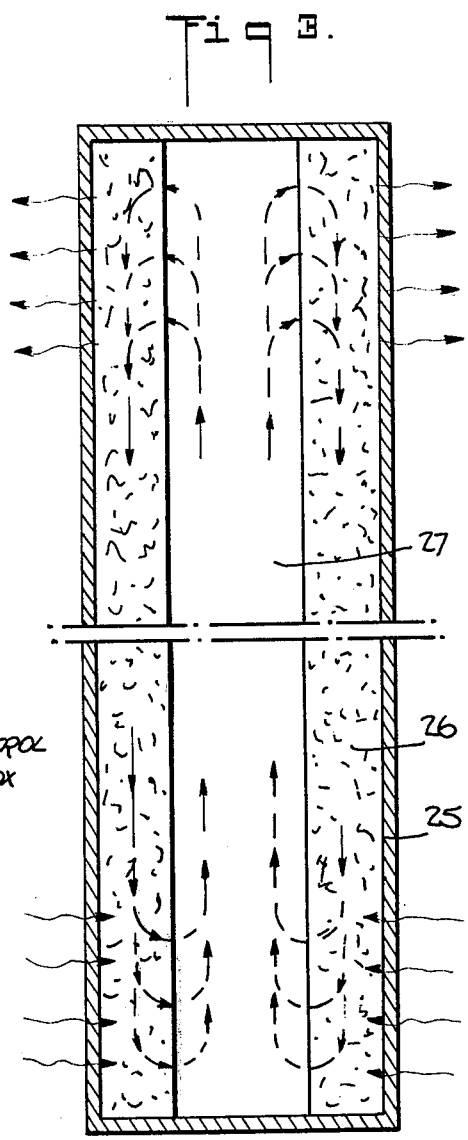

United States Patent [19]
Roop

[11] 3,949,565
[45] Apr. 13, 1976

[54] LIQUIFIED GAS EVAPORATOR

[75] Inventor: Robert N. Roop, Warminster, Pa.

[73] Assignee: Fischer & Porter Co., Warminster, Pa.

[22] Filed: Aug. 9, 1974

[21] Appl. No.: 496,194

[52] U.S. Cl. .................. 62/52; 122/33; 165/105; 222/3
[51] Int. Cl.² .................................. F17C 7/02
[58] Field of Search .............. 62/52, 50, 51; 122/33; 165/105; 222/3

[56] References Cited
UNITED STATES PATENTS

| | | | |
|---|---|---|---|
| 2,304,488 | 12/1942 | Tucker | 62/50 |
| 2,522,026 | 9/1950 | Evans | 62/52 X |
| 3,174,294 | 3/1965 | Lawrence | 62/52 |
| 3,199,303 | 8/1965 | Haumann et al. | 62/52 X |
| 3,293,871 | 12/1966 | Tyree, Jr. | 62/52 |
| 3,346,718 | 10/1967 | Cooley et al. | 62/50 X |
| 3,468,300 | 9/1969 | Geyer et al. | 165/105 X |
| 3,854,454 | 12/1974 | Lazaridis | 122/33 |

Primary Examiner—William F. O'Dea
Assistant Examiner—Ronald C. Capossela

[57] ABSTRACT

An evaporator for converting a liquified gas such as chlorine into a superheated gas. The evaporator is constituted by a pressure vessel having a heat pipe vertically mounted therein, the lower end of the pipe projecting below the vessel and being coupled to a heat source whereby thermal energy from the source is transferred to the interior of the vessel. Liquified gas is fed into the vessel through an inlet pipe to form a pool in the lower zone thereof, in contact with the heat pipe. The gas evaporated from the heated pool is discharged through an outlet pipe.

8 Claims, 3 Drawing Figures

U.S. Patent   April 13, 1976   3,949,565

LIQUIFIED GAS EVAPORATOR

BACKGROUND OF THE INVENTION

This invention relates generally to evaporators adapted to convert liquified gas into a heated gas, and more particularly to a gas evaporator incorporating a heat pipe to transfer heat from an external source to the interior of a pressure vessel.

Though the invention is applicable to the evaporation of various forms of liquified gas, such as ammonia and sulfur dioxide, it will be explained in connection with chlorine, for this gas is widely used in water purification, sewage treatment, and in many industrial processes.

Chlorine evaporators of the type commercially available, make use of a chlorine chamber supported within a larger water chamber having an immersion heater therein. One such evaporator is manufactured by the Fischer & Porter Co. of Warminster, Pa., the device being described in their Instruction Bulletin for the MOdels 71V1006 and 71V1008 Chlorine Evaporators.

In this known type of evaporator, the water heated in the water chamber provides a uniform distribution of heat around the outer surface of the chlorine chamber. As a result, liquid chlorine fed into the chlorine chamber through an inlet pipe, absorbs heat from the water chamber through the wall of the chlorine chamber, causing the liquid chlorine to boil and converting it into a superheated gas which is discharged through an outlet pipe.

One of the drawbacks encountered in this known type of evaporator resides in its poor heat transfer characteristic in that the heat from the heater must be conducted through the water bath and then through the wall of the chlorine chamber. Also because the chlorine chamber is immersed in heater water, the wall of the chlorine chamber is subject to corrosion, further degrading the conditions of heat transfer. Moreover, high operating temperatures are required, giving rise to high heat losses and accelerated rates of corrosion.

A further disadvantage of an existing type of evaporator is that it requires a reasonably pure water supply and plumbing from the evaporator to the supply as well as water temperature and flow controls, thereby complicating the installation and adding to the costs thereof.

SUMMARY OF THE INVENTION

In view of the foregoing, it is the main object of this invention to provide an improved gas evaporator of simplified design, capable of rapidly converting liquified gas into a superheated gas.

More specifically it is an object of this invention to provide a gas evaporator of the above-type wherein the transfer of heat from an external source to the liquified gas is effected by a heat pipe.

Among the significant advantages of the invention are the following:

1. The transfer of large quantities of thermal energy from the external source to the liquified gas is carried out with only a small temperature drop and with no energy input other than the heat being transferred.
2. The need for a water chamber and its associated plumbing and controls, as in existing types of evaporators, is obviated.
3. The evaporator is less complicated than existing types, and is substantially less expensive to manufacture and install.
4. The evaporator is more efficient than existing types, and not as costly to operate.
5. The evaporator is less subject to corrosion and has a longer operating life.

Briefly stated, these objects are attained in a gas evaporator comprising a vertically-disposed cylindrical pressure vessel having a heat pipe coaxially mounted therein, the lower end of the pipe projecting below the vessel and being coupled to a heat source whereby heat energy from the source is transferred to the interior of the vessel. Liquified gas from a source is fed into the vessel through an inlet pipe to form a pool in the lower zone of the vessel in contact with the heat the gas evaporated from the heated pool being discharged through an outlet pipe.

OUTLINE OF THE DRAWING

Figure 1:
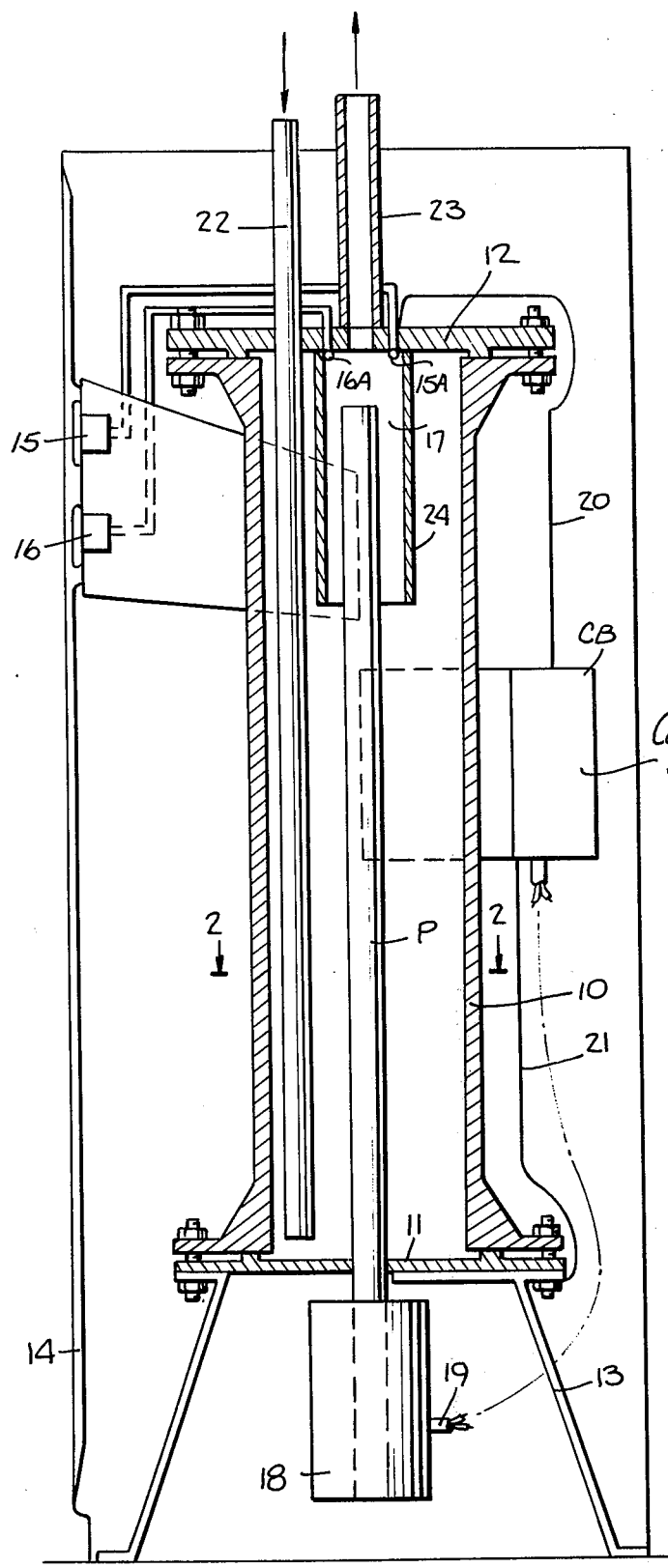
Figure 2:
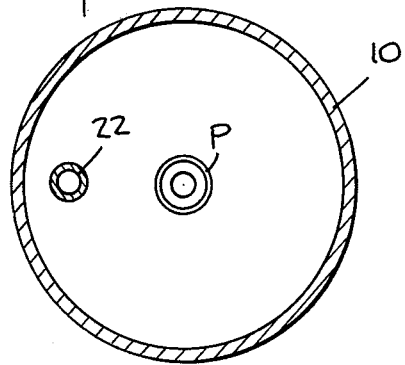

For a better understanding of the invention, as well as further objects and features thereof, reference is made to the following detailed description of the invention to be read in conjunction with the accompanying drawings wherein, FIG. 1 is a longitudinal sectional view of a gas evaporator in accordance with the invention;

FIG. 2 is a transverse section taken in the plane indicated by line 2—2 in FIG. 1, and FIG. 3 is a section taken through the heat pipe.

DESCRIPTION OF THE INVENTION

Structure of Evaporation

Referring now to FIGS. 1 and 2 there is shown a preferred embodiment of a gas evaporator in accordance with the invention, the evaporator including a pressure vessel defined by a vertically-disposed cylindrical shell 10, enclosed at its lower end by a base plate 11 and enclosed at its upper end by a cover plate 12. Shell 10 is provided at either end with an annular flange which is bolted to its associated plate, whereby the vessel may be readily assembled or dismantled.

Base plate 11 is supported on a pedestal 13, thereby raising the pressure vessel above ground level. The vessel is protectively housed within a cabinet 14 whose front panel is provided with a gas pressure indicator 15 and a temperature indicator 16. The indicators are coupled to suitable pressure and temperature sensors 15A and 16A respectively, mounted in an outlet passage 17 below the cover plate.

Mounted coaxially within the cylindrical pressure vessel is a heat pipe P whose lower end portion projects downwardly through base plate 11 and is coupled to a heat source 18. This source preferably takes the form of an electric resistance heater removably clamped to the lower end portion of the heat pipe.

Heater 18 is linked by cable 19 to a power control box CB whose control circuit is connected by a line 20 to a temperature sensor (not shown) disposed in the upper zone of the pressure vessel to sense the temperature of the gas in the superheat region. The control circuit is responsive to signals derived from this sensor and is adapted to govern the operation to maintain a desired superheat temperature. Another sensor (not shown) is connected by line 21 to the control circuit, this sensor measuring the temperature of the heat pipe to detect an overtemperature condition indicating that cleaning is required or that some component has failed. An overtemperature signal will cause the heater to shut off and will activate an external alarm.

Liquified chlorine is fed into the pressure vessel through an inlet pipe 22 which passes through cover plate 12 and terminates at a point adjacent base plate 11. The gas generated in the vessel is discharged through an outlet pipe 23 which communicates with the vessel through an opening in the cover plate. This opening is the outlet for passage 17 which is defined by a baffle sleeve 24 which extends from the cover plate and is concentric with the upper end portion of heat pipe P. Thus gas generated within the chamber can be discharged only through the annular passage created between the baffle and the upper end of the heat pipe.

Structure of Heat Pipe

As shown separately in FIG. 3, the heat pipe, generally designated by letter P, is a self-contained closed system capable of transporting large quantities of heat from a source to a heat sink with only a small drop in temperature. The heat pipe has no moving parts and requires no input energy other than the heat transferred thereby. In the orientation of the heat pipe shown in FIG. 2, with the heat source placed below the heat sink, the internal capillary fluid pumping forces are assisted by gravity, thereby optimizing the power that the unit can transfer.

Heat pipe P consists of a long metal tube 25 sealed at both ends, the interior wall of the tube being lined with a wick 26, preferably fabricated of sintered metal powder, such as copper. The wick is charged with a working fluid which is the primary heat transfer medium. Heat transfer in the pipe takes place through its hollow vapor core 27.

Tube 25 is formed of a metal of high thermal conductivity which is chemically non-reactive with respect to the liquified gas in contact with the outer surface thereof. The metal of the tube must also be compatible with the material of the wick which lines its interior surface. Tube 25 in a gas evaporator intended for chlorine may be made of monel, copper or any other suitable metal of high thermal conductivity which is non-reactive with respect to chlorine. The working fluid may be water, ammonia, Freon or alcohol. Only enough fluid to saturate the wick is introduced into the heat pipe before it is sealed.

The lower end portion of the heat pipe to which the heater is attached, acts as the evaporator section. Heat energy is transferred by conduction through the wall of tube 25 and the saturated wick in the evaporator section to the liquid-vapor interface where the working fluid evaporates. The vapor flows through the vapor core 27 to the condenser section which is that portion of the pipe exposed to a heat sink. In the context of the gas evaporator structure shown, the heat sink is that portion of the heat pipe disposed within the pressure vessel and in contact with chlorine.

In the condenser section, the vapor flowing through vapor core 27 is caused to condense at the vapor-liquid interface. Heat is transferred by conduction from the interface through the saturated wick into the heat sink surrounding the condenser section. The working fluid condensate in the condenser section migrates through the wick by capillary action back to the evaporator section, where the cycle is repeated. A more detailed description of heat pipes may be found in U.S. Pat. Nos. 3,651,240 and 3,665,573.

Operation of Evaporator

We shall assume that power is turned on, and that heat is being supplied by heater 18 to the evaporator section of heat pipe P. We shall also assume that the demand for chlorine gas is fixed.

Liquid chlorine from a suitable external supply tank or container enters the pressure vessel through inlet pipe 22 and forms a liquid pool in the lower zone of the vessel which is in direct contact with the heat pipe. The liquid in the pool absorbs heat from the pipe, causing the liquid chlorine to boil and converting it into heated chlorine gas which is discharged from the pressure vessel through outlet 23 leading to a gas dispensing system. This system may be any process requiring chlorine gas.

Since initially the demand of the chlorine dispensing system exceeds the rate at which liquid chlorine is converted into gas, the pressure of the gas in the pressure vessel, as indicated by meter 15, is somewhat less than the normal operating pressure. This normal operating pressure is the pressure above the liquid chlorine within the external supply tank.

As a consequence, liquid chlorine enters the pressure vessel at a rate which exceeds the rate at which it is converted into gas, and the level of the pool of liquid chlorine in the pressure vessel goes up. As the level of the pool rises, the liquid contact area between the pool and the heat pipe increases, thereby increasing the rate at which the liquid is converted into gas.

This increased vaporization rate, coupled with the fixed demand of the gas dispensing system causes the pressure of gas within the pressure vessel to increase, and as the gas pressure increases the rate at which liquid chlorine enters the chamber decreases until equilibrium condition is reached where the rate at which liquid chlorine is being converted into chlorine gas exactly equals the entry rate of the liquid chlorine into the pressure vessel.

When the equilibrium condition is attained, the level of the liquid chlorine pool within the pressure vessel ceases to rise. In practice, the evaporator may be designed so that the pressure vessel is somewhat less than half full when equilibrium is reached at its maximum operating capacity and proper operating temperature. However the actual level of the liquid chlorine pool is dependent upon the operating temperature and the demand of the chlorine gas dispensing system.

We shall now consider the effect of a change in demand on the level of the pool in the pressure vessel. If at a given equilibrium condition, the demand of the gas dispensing system decreases, all other factors being unchanged, the rate at which liquid chlorine is converted into chlorine gas will, momentarily, remain the same. This excessive rate of gas evolution over consumption increases the chlorine gas pressure in the vessel and forces the liquid chlorine to flow back out of the vessel. Thus, the liquid level falls until the liquid chlorine-heat pipe contact area is reduced to satisfy this new equilibrium condition. Conversely, if the demand increases, all other factors being unchanged, the liquid level increases to bring about a new equilibrium condition.

Now let us consider the effect of a change in operating temperature. If at a given equilibrium condition, the temperature of the heat pipe decreases, all other factors being unchanged, the rate at which liquid chlorine is converted into gas will, momentarily, remain the same. As the temperature falls, the decreased rate of gas evolution falls below the consumption rate and the chlorine gas pressure in the vessel decreases slightly. This allows more liquid chlorine to flow into the vessel. Thus the liquid level rises until the liquid contact-heat pipe area is increased to satisfy this new equilibrium condition. And, conversely, if the temperature increases, all other factors being unchanged, the liquid level decreases to a new equilibrium condition.

As heat is transferred from the heat pipe to the liquid chlorine, the temperature of the superheated gas falls until the low limit of the heat pipe control thermostat in the control box CB is reached. At this temperature, the thermostat acts to energize electric heater 18 to supply the heat necessary to maintain the desired operating temperature. Should the heat input exceed requirements, the temperature of the superheated gas reaches the upper limit of the control thermostat and the power supply to the heater is automatically shut off.

Prior to discharge from the evaporator, the chlorine gas is superheated, i.e., it absorbs additional heat at the same pressure as it travels to outlet pipe 23 along the hot wall of the super heat baffle 24.

While there has been shown and described preferred embodiments, in accordance with the invention, it will be appreciated that many changes and modifications may be made therein without, however, departing from the essential spirit thereof.

I claim:

1. An evaporator for converting a liquified gas into a heated gas to be supplied to a gas dispensing system, said evaporator comprising:
   A. a pressure vessel provided at its lower end with a base plate and at its upper end with a top plate, said vessel having an unimpeded inlet pipe adapted to be coupled to a source of liquified gas to feed liquified gas into the vessel to form a pool therein, from which pool gas is evaporated to fill the space thereabove in said vessel to create gas pressure therein, said inlet pipe passing through said top plate and terminating near said base plate, and an outlet pipe to supply the gas evaporated from said pool to said system in accordance with the demand thereof, said outlet pipe being coupled to said top plate and communicating with an opening therein,
   B. a heat pipe vertically mounted in said vessel and in contact with said pool, the lower end of said pipe extending through said base plate below the bottom of said vessel to expose the evaporator section of the pipe, and
   C. means to apply heat to said evaporator section whereby said heat is transferred to the section of said pipe within said vessel in contact with said pool to boil said liquified gas and to convert it into a heated gas to be supplied to said system, said pool reaching an equilibrium level in said pressure vessel at which the rate of liquified gas being converted into gas equals the rate at which liquified gas enters the vessel through said inlet pipe, after which further evaporation of said gas from said pool results in an increase in gas pressure in said vessel forcing the liquified gas to flow back out of said vessel through said inlet pipe to said source.

2. An evaporator as set forth in claim 1, wherein said pressure vessel is defined by a cylinder vertically supported on said base plate which encloses the lower end thereof, said base plate being mounted on a pedestal to provide a space above ground to accommodate the evaporator section of said heat pipe.

3. An evaporator as set forth in claim 2, wherein said heat source is constituted by a resistance-type electrical heater attached to said evaporator section of the pipe.

4. An evaporator as set forth in claim 3, further including means to sense the temperature of the gas fed to said outlet pipe to produce a control signal for governing the operation of said electric heater.

5. An evaporator as set forth in claim 2, wherein said heat pipe is coaxially disposed within said cylindrical pressure vessel.

6. An evaporator as set forth in claim 1, wherein said heat pipe extends within said vessel to a point adjacent said top plate, and further including a tubular baffle depending from said top plate and concentric with the upper end of said heat pipe to define an annular passage leading to said outlet pipe and acting to superheat the gas being discharged therethrough.

7. An evaporator as set forth in claim 1, wherein said heat pipe is constituted by a metal tube of high thermal conductivity formed of a metal non-reactive with the gas being evaporated and a wick lining the internal wall of the metal tube, said wall being charged with a liquid which evaporates to transfer heat from the evaporator section of the pipe to the liquid pool in the vessel.

8. An evaporator as set forth in claim 1, wherein said gas is chlorine.

* * * * *